United States Patent [19]

Simpson

[11] Patent Number: 4,752,778
[45] Date of Patent: Jun. 21, 1988

[54] MICROWAVE BARRIER

[75] Inventor: Ian T. Simpson, Santa Cruz, Calif.

[73] Assignee: Hormann Sicherheitstechnik GmbH, Kirchseeon/Munich, Fed. Rep. of Germany

[21] Appl. No.: 639,812

[22] Filed: Oct. 31, 1984

[51] Int. Cl.[4] .............................................. G01S 13/02
[52] U.S. Cl. ..................................................... 342/27
[58] Field of Search .................. 343/5 PD, 18 B, 909, 343/912; 340/552, 553, 554

[56] References Cited

U.S. PATENT DOCUMENTS

| | | | |
|---|---|---|---|
| 2,665,383 | 1/1954 | Marie | 343/18 B |
| 2,939,142 | 5/1960 | Fernsler | 343/909 X |
| 3,300,768 | 1/1967 | Bystrom et al. | 343/5 PD |
| 3,815,138 | 6/1974 | Haley | 343/909 X |
| 4,191,953 | 3/1980 | Woode | 343/5 PD X |
| 4,231,040 | 10/1980 | Walker | 343/373 |

OTHER PUBLICATIONS

IEE Standard Dictionary of Electrical and Electronics Terms, Third Edition, Jul. 20, 1984, p. 313.

Primary Examiner—T. H. Tubbesing
Assistant Examiner—Mack Hellner
Attorney, Agent, or Firm—Townsend & Townsend

[57] ABSTRACT

The invention relates to a microwave barrier which uses at least two aerial beams of which one forms a protected zone extending down to the ground while the other is inclined upwards relative to the horizontal. In this way by the use of a simple construction intruders can be prevented both from crawling under the barrier and jumping over it.

15 Claims, 14 Drawing Sheets

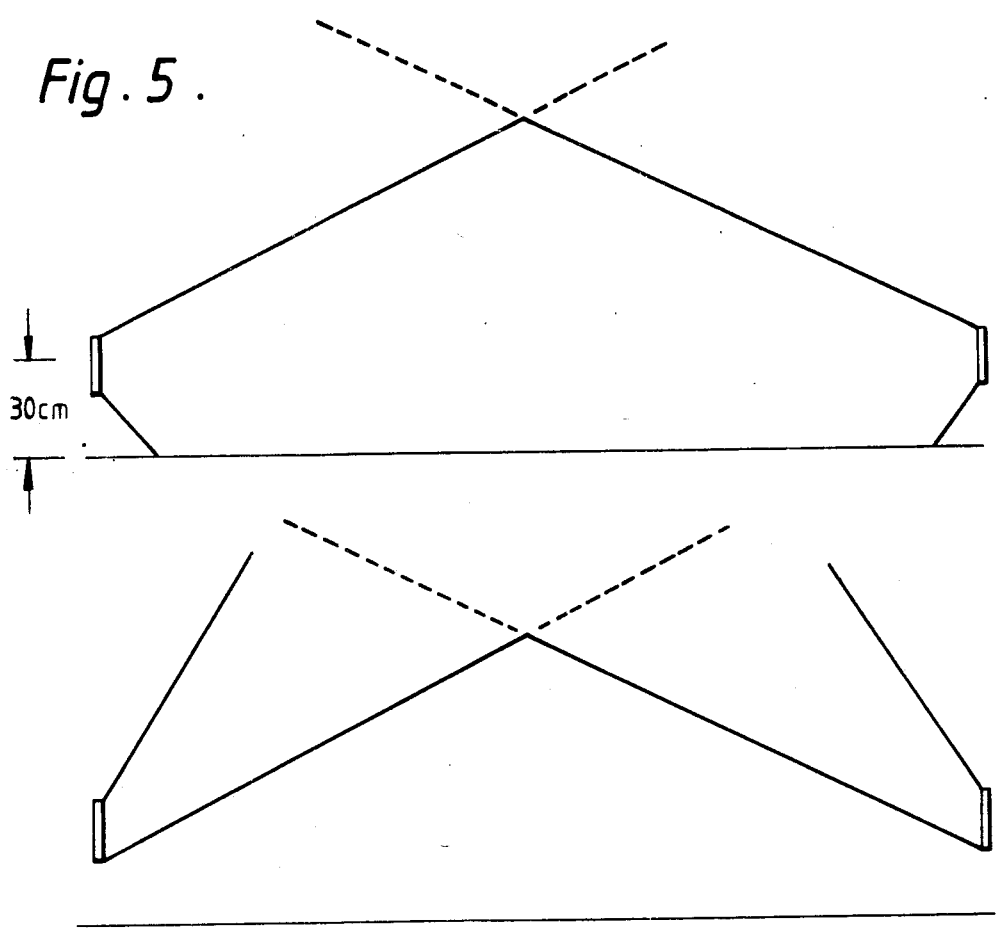
Fig. 5.
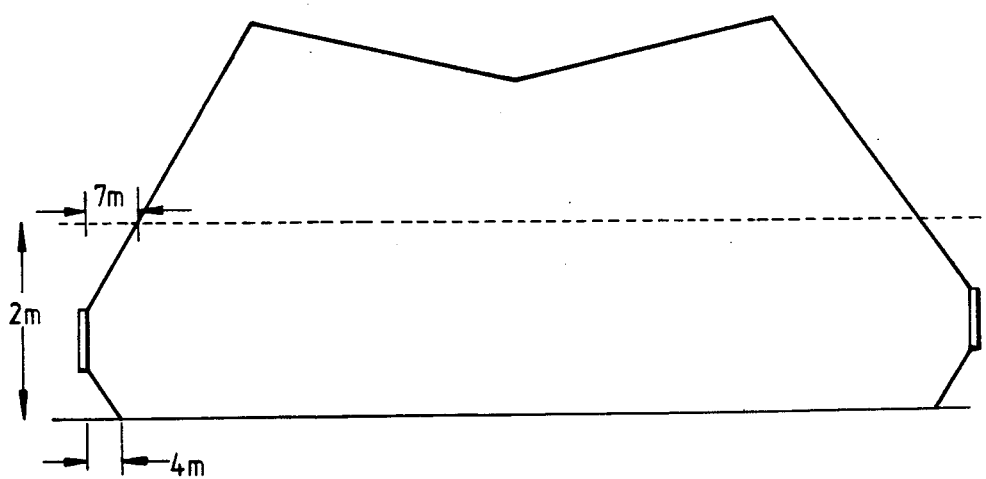

MICROWAVE BARRIER

Microwave barriers are used in order to secure areas or protected zones against intruders. The microwave transmitter and the microwave receiver are arranged at opposite ends of a section to be monitored. If the microwave aerial beam is completely or partially broken by an intruder a circuit provided in the receiver triggers an alarm signal.

The range covered by such a microwave barrier must extend on the one hand down to the ground (so that an intruder cannot crawl through under the beam) and must on the other hand reach sufficiently high (in order to prevent an intruder jumping over the beam).

A known microwave barrier (British Patent No. 1475111) uses one single aerial beam or a number of aerial elements which determine one single beam propagation angle. As will be demonstrated in greater detail below, this results in an unsatisfactory compromise between the requirements for good monitoring close to the ground (protection against crawling under the beam) and at height (protection against jumping over the beam).

Microwave barriers must in general have a range (length of the protected section) between 10 and 200 meters. An alarm should be triggered when an intruder attempts to crawl through under the microwave barrier, to pass through the barrier or to jump over it. In order to meet these requirements, the monitoring zone must extend on the one hand down to the ground and on the other hand up to a height of more than 2 meters.

In order to satisfy both requirements, it would be advantageous to use an aerial beam which extends over a comparatively large vertical distance in the region of the transmitter and the receiver. The beam width and the geometric dimensions of a microwave aerial are combined with the wavelength of the radiation by the following formula:

$$\text{beam width (in degrees)} \delta \lambda / a$$

where
$\lambda$ = wavelength
a = aperture of the aerial

Thus a small value for the aerial aperture is necessary in order to achieve a large beam width. The beam width corresponds to the angle at which the radiation from the aerial is propagated. Numerically it corresponds to the angular range in which the greater part of the microwave signal is focused.

If an aerial with an aperture of 20 cm is arranged at a height of 100 cm above the ground (cf. FIG. 1), then with a wavelength of 3 cm this gives a beam width of 8.6°. Thus the aerial beam diverges by 4.3° upwards and downwards. As a distance of 12 meters (from the transmitter or the receiver) this aerial beam encounters the ground or the 2 meter height.

If the aperture of the aerial is reduced then the divergence of the aerial beam is increased. Accordingly the points at which the aerial beam reaches the ground or the two meter height come closer to the transmitter or the receiver. Although this is an advantage for the monitoring it leads to considerable problems because of ground reflections.

If there is no intruder present the signal received by the receiver consists of two principal components, namely the direct signal and the signal reflected on the ground (cf. the schematic representation in FIG. 2).

The electrical received field strength $E_r$ is given by the following formula:

$$E_r = E_1(1 + \alpha^{j\phi})$$

in which
$E_1$ = electrical field strength resulting from the direct signal,
$\alpha$ = fraction of the signal reflected by the ground, $$\phi = \frac{2\pi}{\lambda}\left(2\sqrt{\frac{R^2}{4} + h^2} - R\right) + \pi$$

$\lambda$ = wavelength
h = mounting height of the system
R = distance from transmitter and receiver.

The two components of the received signal thus have a phase shift $\phi$. The magnitude of the received signal therefore depends upon the magnitude of the component reflected on the ground ($\alpha$) and upon the phase shift ($\phi$).

At very low values of the angle $\theta$, at which the aerial beam strikes the ground (cf. FIG. 2), the magnitude of the component reflected on the ground is equal to the direct component. The phase shift of 180° which the wave reflected on the ground undergoes on reflection also applies to waves which are polarised both horizontally and vertically, and accordingly waves subject to circular polarisation. Therefore in microwave barriers the component reflected on the ground constitutes a general problem since at certain distances and certain mounting heights it obliterates the direct component.

Practical microwave aerials focus the radiation in one beam. The magnitude of the signal reflected on the ground is also influenced by the beam width of the aerial. Wider beams result in greater values for the signal reflected on the ground.

FIG. 3 clarifies the ground reflection effect for a vertical aerial with an aperture of 20 cm and a mounting height of 100 cm above the ground. The diagram shows the dependence of the level of the received signal upon the distance between the transmitter and the receiver. The ordinate is divided into logarithmic units of the received signal level. The distance between the transmitter and the receiver is plotted—also in logarithmic division—in the abscissa. It will be noted that at certain distances, particularly at 69 meters, the received signal is considerably attenuated. The reason for this resides in the fact that at these points the component reflected on the ground is in phase opposition to the direct component. The beam width of the aerial ensures that these effects do not occur at very short distances since the beam does not strike the ground until a distance of 12 meters from both ends (thus corresponding to a total distance of 24 meters).

The dotted curve in FIG. 3 shows the influence of a reduction in the mounting height of the aerial by 10 cm. The general course of the curve remains similar; however, the position of the minimum is altered. In practice this leads in some cases to difficulties in which the effective mounting height is altered by the growth the vegetation or by snowfall. In this way the effective mounting height is reduced, which can lead to the received signal being too low in the minimum ranges to ensure reliable functioning. This can result in false alarms and other operating problems.

One solution to this problem is to reduce the beam width of the aerials in order thus to reduce the wave reflected on the ground. The narrower aerial beam thus produced does not, however, offer satisfactory protection against an intruder crawling under or jumping over the microwave barrier. If very large aerials with an aperture of 2 meters were used a sufficient protection on the ground and at a height of 2 meters would be possible; however, the large aerial aperture would give rise to difficulties as regards the alignment of the very narrow aerial beam (approximately 0.86°), and also as regards the mechanical mounting which is necessary to ensure stability in high winds.

Another solution to the problem caused by the ground reflection effect is to ensure that the component reflected on the ground never completely obliterates the direct component within the installation rangee of 10 to 200 meters. For this purpose the mounting height of the aerial must be reduced. In the solid curve FIG. 4 shows the ratios at an aerial mounting height of 30 cm. If this is compared with FIG. 3 it will be noted that the relative received signal amplitude is continually reduced with the transmitter/receiver distance and that no obliteration effects (as in FIG. 3) occur within the required distance range. The reduction in the mounting height by comparison with the conditions in FIG. 3 does result in an increase in the signal reflected on the ground but it excludes a complete phase opposition to the direct signal. In fact the first obliteration occurs at a distance (between the transmitter and the receiver) of 6 meters, that is to say at a value which is not needed in practice.

The dotted curve in FIG. 4 shows the ratios for a mounting height of 20 cm. It will be noted that here too there is an even drop in the relative received signal amplitude with increasing distance and that no direct obliteration occurs in the distance range shown.

The principal disadvantage of these constructions, however, is that the reduction in the mounting height does not provide sufficient protection at height, and thus there is a danger of an intruder jumping over the microwave barrier.

The object of the invention, therefore, is to develop a microwave barrier which avoids the disadvantages set out above, ensures satisfactory protection both on the ground and at a height, avoids the disadvantages described above of the direct component being largely obliterated by the component reflected on the ground, and finally makes do with comparatively small aerial dimensions, and in particular a small aerial aperture.

This object is achieved according to the invention by the provision of at least two aerial beams of which one forms a protection zone extending down to the ground whilst the other is inclined upwards relative to the horizontal by an angle which is greater than the half-power width of this beam.

BRIEF DESCRIPTION OF THE DRAWINGS

FIGS. 1–5, 11–13, 17, 19, and 23–25, show various antenna signal radiation patterns.

In the microwave barrier according to the invention the transmitter and the receiver are equipped with one or more aerials which are arranged sufficiently close to the ground that no obliteration effects caused by ground reflection occur. Thus under all ground conditions a sufficient signal level is ensured for the system. In addition, according to the invention at least one further aerial beam is provided which is radiated upwards at an angle at which the greater part of the beam does not strike the ground. Under these conditions there is no signal reflected on the ground in relation to this upwardly directed beam; therefore the alteration in the signal level with the distance remains smooth and no obliteration effects occur.

However, any movement occurring within this upper beam or these upper beams is determined in the receiver as an alteration in the signal level. This results in a significant improvement in the system height. FIG. 5 shows the basic diagram of the double-beam system according to the invention. In the illustrated embodiment one single transmitting and receiving aerial with an aperture of 20 cm is provided, and two aerial beams with a beam width of 8.6° are produced. The beam axis of the lower aerial beam runs parallel to the ground; the beam axis of the upper aerial beam is inclined upwards by 8.6° relative to the horizontal.

At a mounting height of 30 cm and a distance between the transmitter and receiver of 100 meters the lower aerial beam strikes the ground at a distance of 4 meters (from both ends of the monitored section) and reaches the 2 meter height at a distance of 21 meters from both ends. The upper aerial beam does not strike the ground, so no alterations int he received signal level can occur as a result of ground reflections; the upper aerial beam reaches the 2 meter height at a distance of 7 meters from both ends.

Further aerial beams can be provided so that if necessary an additional protection at height can be ensured. The circuit in the receiver is provided so that an alarm is triggered when one or more of the aerial beams is completely or partially broken.

Figure 6:
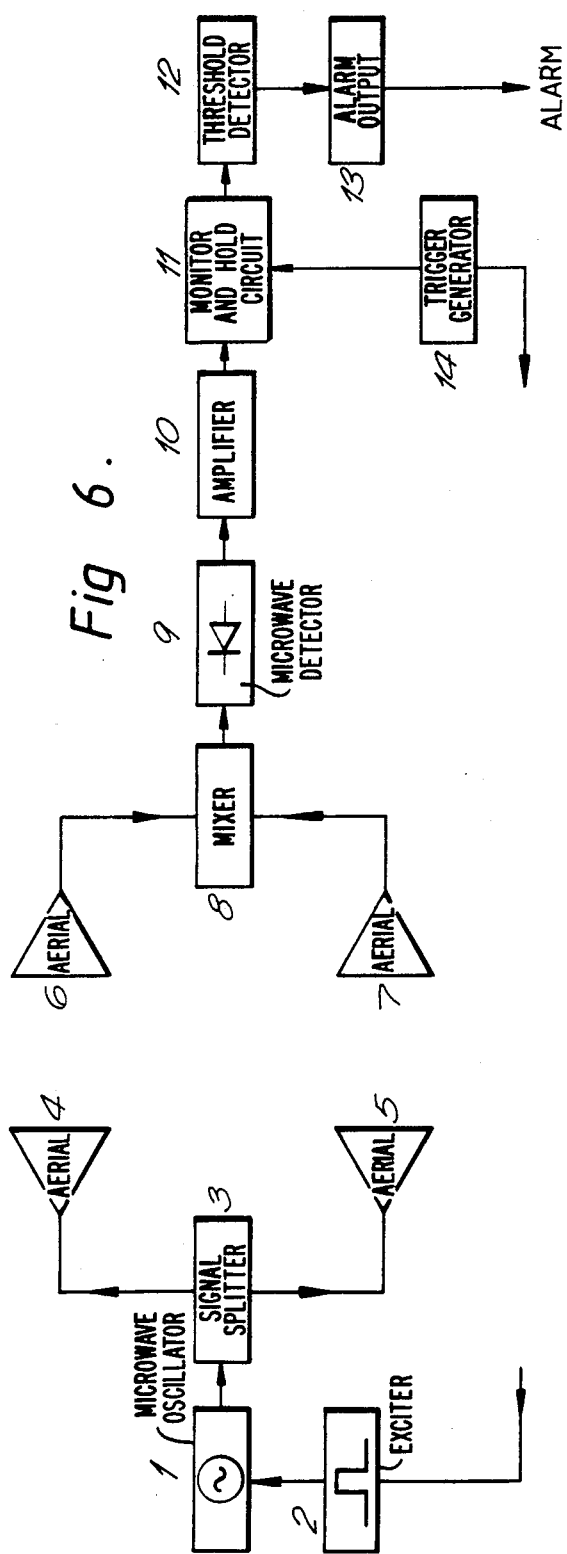
FIG. 6 shows an embodiment of the microwave system according to the invention.

FIG. 6 shows a complete embodiment of the microwave barrier according to the invention. It contains a microwave transmitter and a separate microwave receiver both of which are arranged on a metal base plate.

The microwave transmitter contains a microwave oscillator 1 which uses a Ga-As field effect transistor. If the oscillator 1 is supplied with current by an exciter 2 it produces an oscillation with the desired microwave frequency. The microwave signal thus produced is passed via a splitter 3 to two aerials 4, 5. The lower aerial 5 is aligned directly with the receiver, whilst the upper aerial 4 radiates the beam upwards at an angle so that the greater part of the beam is not in contact with the ground. Thus the microwave transmitter contains two comparatively small aerials with two beam directions which are independent of each other.

The receiver is arranged at the other end of the section to be monitored. The incoming microwave radiation is received by two aerials 6 and 7. Of these the lower aerial 7 is arranged close to the ground so that the proportion of the beam reflected on the ground can never obliterate the beam coming directly from the transmitter. The upper aerial 6 is arranged so that its axis of maximum sensitivity is inclined upwards, whilst this aerial 6 has only a very low sensitivity to the signal reflected by the ground. The use of these two separate transmitting and receiving beams leads to a thorough immunity to ground reflection effects and at the same time to good monitoring at height. The signal received by the aerials 6 and 7 is combined in a microwave mixer 8. This mixer 8 supplies an output signal which corresponds to the vector sum of the input signals supplied by the two aerials.

The resulting total signal is rectified in a microwave detector 9 which can be formed for example by a Schottky barrier detector diode. This circuit supplies a small output voltage proportional to the magnitude of the total signal.

The rectified signal is amplified by a series of amplifiers the degree of amplification of which is variable and by means of which a circuit 10 with automatic amplification control is automatically adjusted $\alpha$. This circuit 10 effects a slow adaptation of the amplification and compensates for differing installation ranges and long-term effects such as environmental changes which are caused by growth of grass or snowfall. Short-term alterations, such as those caused by an intruder, do not trigger any alteration in the degree of amplification by the circuit 10. Such alterations in the received signal level pass to the monitoring and holding circuit 11.

The transmitter is constructed in such a way that in order to save power costs it transmits microwave impulses. Accordingly the signal received by the receiver is also in the form of impulses. The control signal activating the transmitter is transmitted by a trigger generator 14 in the receiver via connecting leads to the transmitter. The trigger signal also serves to activate the monitoring and holding circuit 11 in the receiver which converts the impulse output of the circuit 10 into a continuous signal proportional to the magnitude of the output impulse. If an intruder enters the range of the microwave barrier this results in a low-frequency alteration in the output signal from the monitoring and holding circuit 11. A threshold detector 12 processes this low-frequency signal and determines the size and speed of the intruder. If the change in amplitude exceeds a predetermined threshold an alarm output means 13 is actuated. The behaviour of the system depends upon where the attempt at intrusion took place.

An intruder crawling on the ground causes an alteration in the signal received by the lower aerial 7. An intruder who attempts to jump over the microwave barrier near the transmitter breaks the beam transmitted by the upper aerial 4. As a result a part of this signal is reflected towards the receiver and—depending upon the relative position of the intruder—is detected either by the upper or the lower aerial 6 or 7 respectively. An intruder who attempts to jump over the microwave barrier near the receiver reflects a part of the transmitted signal to the upper receiving aerial 6 and causes an alteration in the signal here.

In any case the attempt by an intruder will cause an alteration in the received signal on one or both receiving aerials. This alteration in the signal is processed by the associated circuits.

Figure 7:
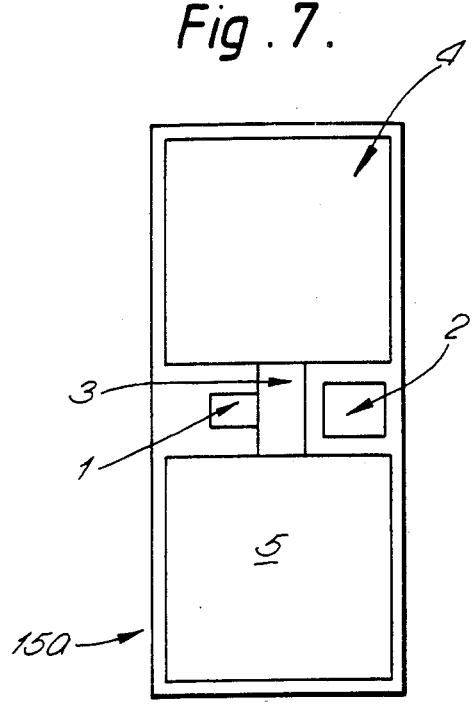
Figure 8:
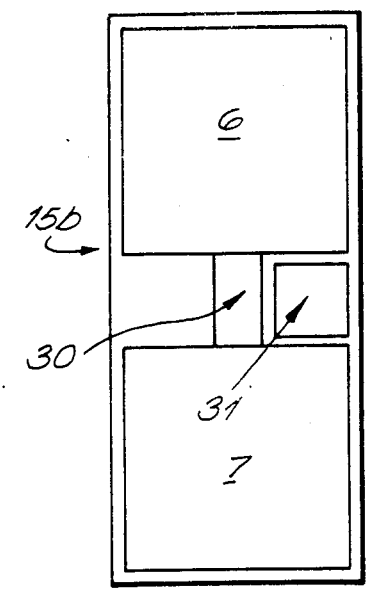

FIGS. 7 and 8 show the transmitter and receiver. The aerials 4, 5, 6 and 7 are constructed in planar form. The aerials 4 and 6 have the same beam direction angle, but this is a different beam direction angle from the aerials 5 and 7 (which are identical to each other in this respect). The oscillator 1, the splitter 3 and the exciter 2 are arranged on a base plate 15a which at the same time forms the mechanical mounting and the conductive plane (earth) which is necessary for the functioning of the microwave circuit.

In the receiver all the components are arranged on a conductive base plate 15b in a corresponding manner. The aerials 6 and 7 are provided in the same manner as in the transmitter. The functions of the mixer 8 and the detector 9 are combined in a microwave receiving module 30. The output of this receiving module 30 is connected to the input of a receiver circuit 31 which fulfils the functions of the circuit 10 with automatic amplification control, the monitoring and holding circuit 11, the threshold detector 12, the alarm output means 13 and the trigger generator 14.

The function of the planar aerial is explained below, even though basically within the scope of the invention any aerial which produces a directed aerial beam can be used.

Figure 1:
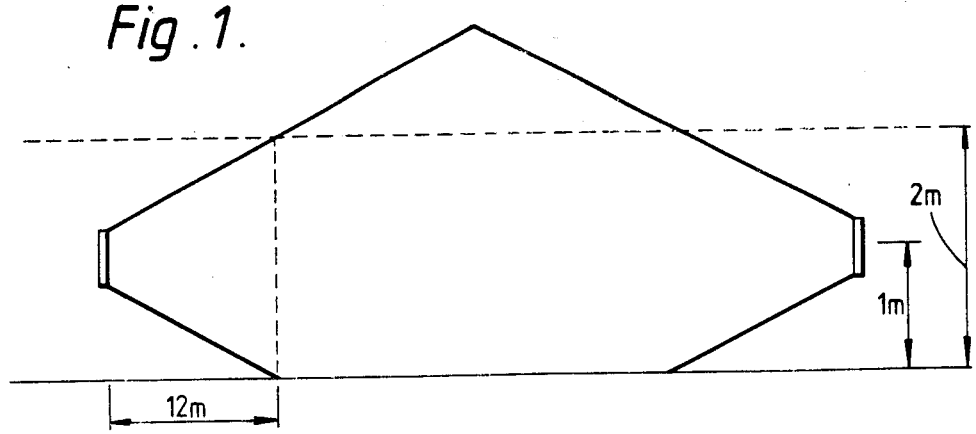
Figure 2:
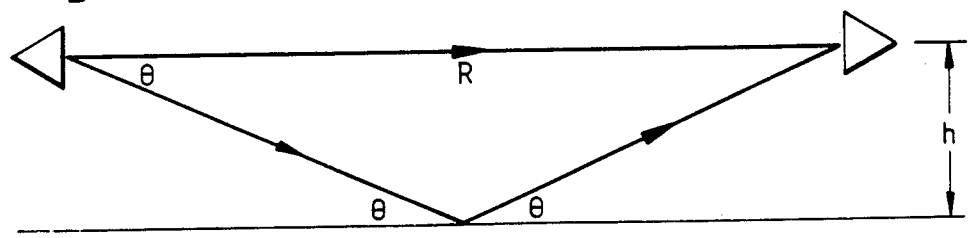
Figure 10:
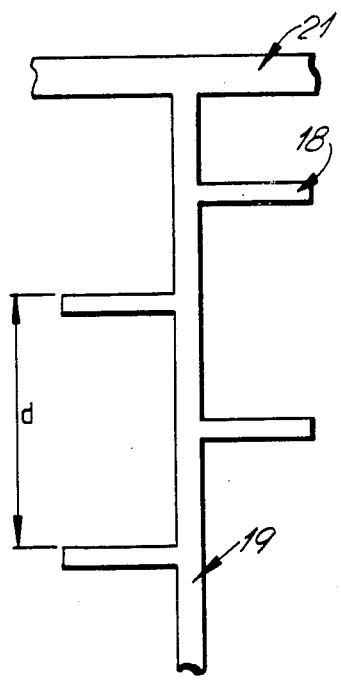
FIGS. 9, 10, 16. 18. and 22, show a planar antenna.
Figure 9:
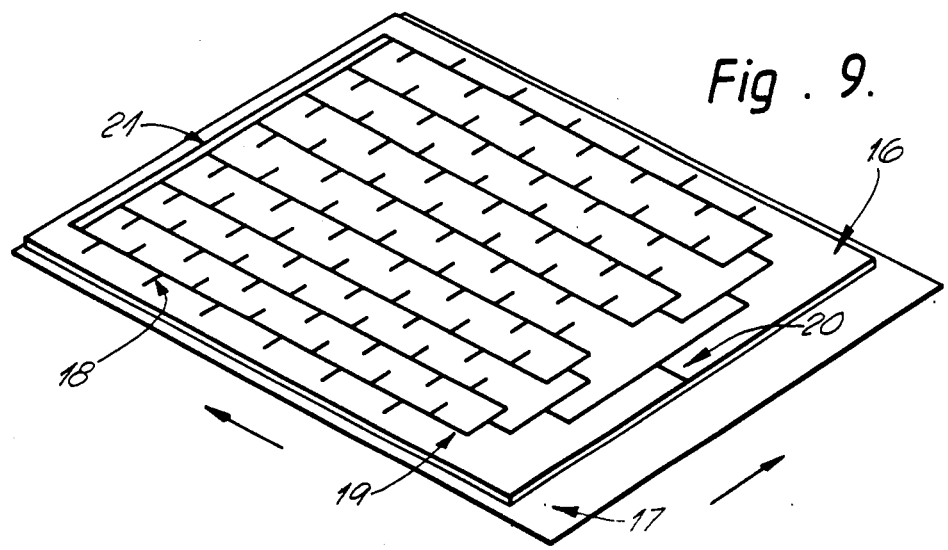

A planar aerial contains a pattern of metal strips 19 which are etched onto an insulating dielectric substrate 16. Thus these strips 19 are located at a specific distance from a conductive metal base plate 17 (cf. FIG. 9). The pattern of metal strips 19 contains a plurality of dipoles 18 (of half wave length) which are connected to supply lines. A microwave signal is supplied to the input connection 20 and distributed over eight strips 19 which form the supply lines. The microwave signals delivered to these supply lines passes along the strips to the end 21 and excites the dipoles 18. Each dipole radiates the microwave signal into the space above the planar aerial. The distance between the individual dipoles can be selected so that the proportions of the beam coming from the individual dipoles add up in magnitude and phase to a specific angular direction and thus produce a definite beam. FIG. 10 shows a diagram of a supply line and the associated dipoles.

In the horizontal direction (FIG. 9) the microwave signal has the same amplitude and phase at any moment. This ensures that the maximum beam direction encloses an angle of 90° with the horizontal axis of the substrate.

In the vertical plane the distance of the dipoles 18 is selected so as to produce the desired beam direction. It can be determined from the following formula:

$$\alpha = \sin^{-1}(\sqrt{\epsilon_r} - \lambda d)$$

in which
$\alpha$ = beam direction relative to the perpendicular to the substrate plane,
$\epsilon_r$ = effective relative dielectric constant of the substrate material,
$\lambda$ = wavelength of the microwave signal,
d = distance between adjacent dipoles on the same side of the supply line (cf. FIG. 10).

Figure 11:
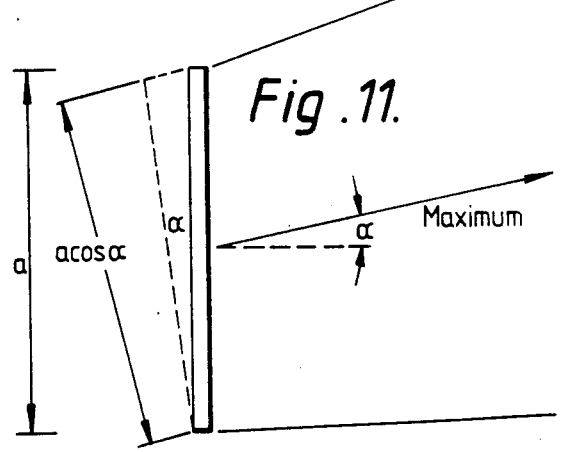
Figure 3:
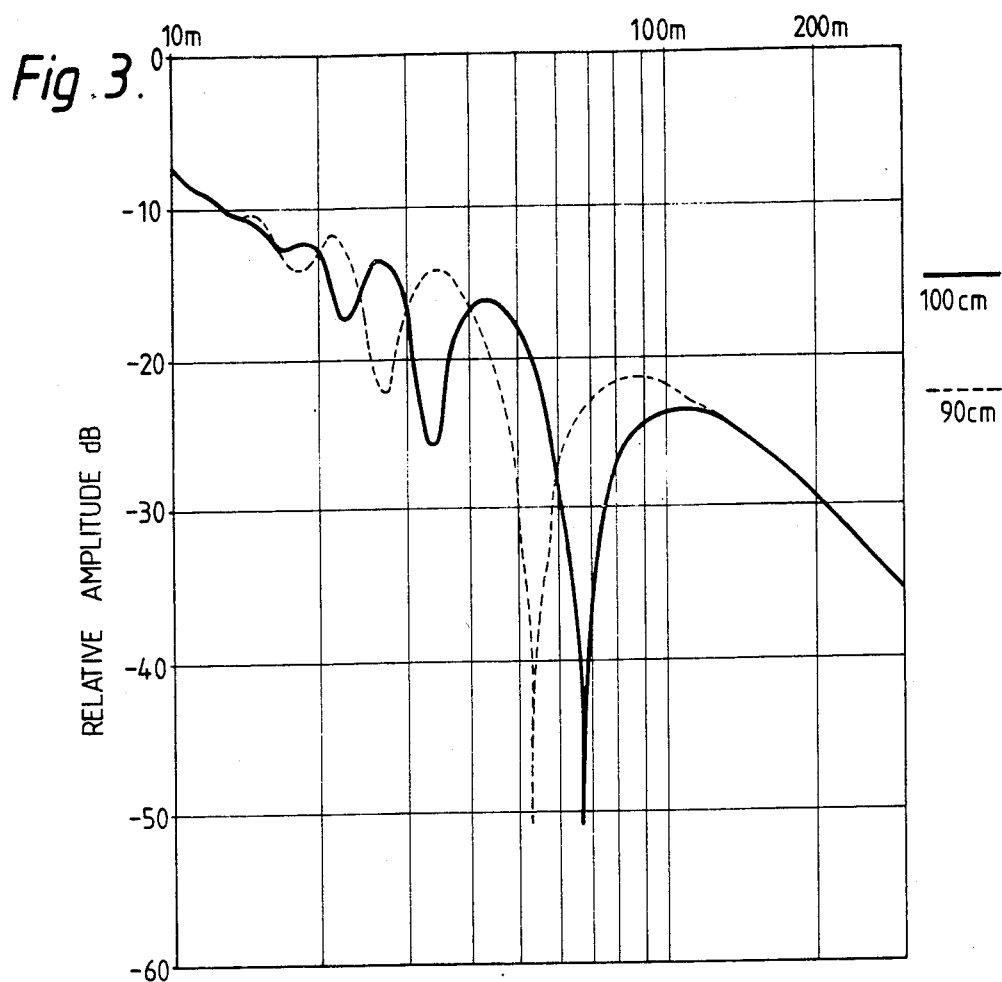

FIG. 11 shows the maximum beam direction relative to the plane of the substrate.

The beam width $\theta$ of each aerial is combined with the geometric dimensions of the radiating aperture and with the beam direction by the formula which has already been given $$\theta \simeq \lambda a$$

in which
$\lambda$ = wavelength of the microwave signal,
a = effective aperture in the direction of the beam propagation.

For a planar arrangement with a beam at an angle $\alpha$ the effective dimension of the aperture = a·cos $\alpha$.

The greater part of the energy radiated by an aerial lies within an angular range of $\alpha \pm \theta/2$. In order to ensure that the upper beam does not undergo any significant ground reflection the angle $\alpha$ must be inclined upwards and must be greater than half the beam width ($\theta/2$) of the upper aerial. Thus the following formula applies $$\alpha > \theta/2.$$

Figure 12:
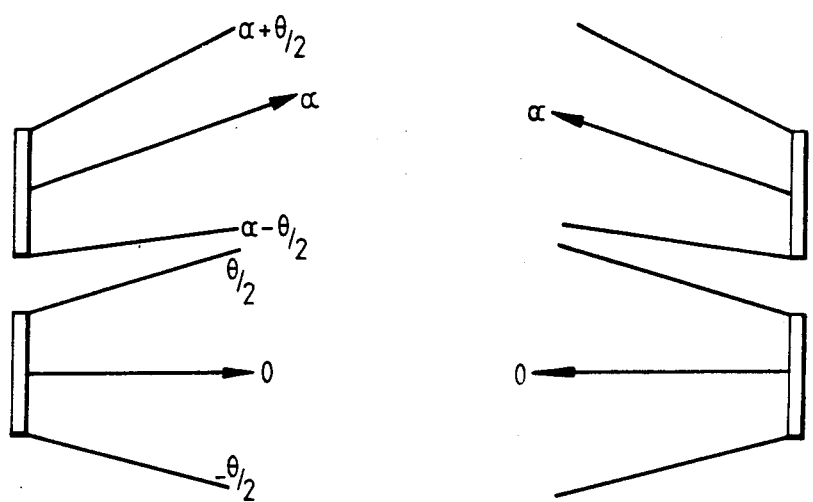

The lower aerials 5 and 7 are dimensioned so that they supply a maximum signal in the receiver. The beam angles of these two aerial beams should be zero for this purpose. FIG. 12 shows the resulting arrangement.

Figure 13:
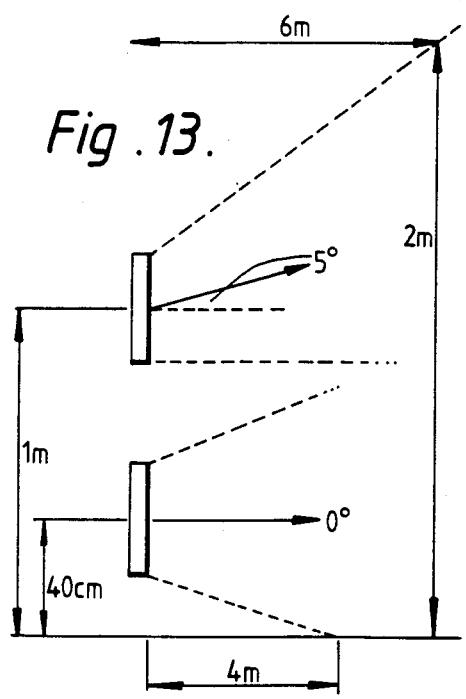

The upper aerial used has a vertical radiating aperture of 34.5 cm, the lower aerial has one of 32.5 cm. This results for the upper aerial beam in a beam width of 5.0° and for the lower aerial beam a beam width of 5.3°. The upper aerial produces a beam which is propagated upwards at an angle of 5.0°. The aerials are arranged on a rigid base plate which ensures the correct relative position and at the same time forms the conductive metal mounting and constitutes a mounting plate for the electronic components. The mounting heights of the aerials above the ground for the embodiment being described are shown in FIG. 13.

In this arrangement the lower aerial beam strikes the ground at a distance of 4 meters; the upper aerial beam crosses the 2 meter height at a distance of 6 meters. Such an arrangement on the one hand ensures good monitoring of the ground and on the other hand prevents attempts to jump over the microwave barrier.

Figure 14:
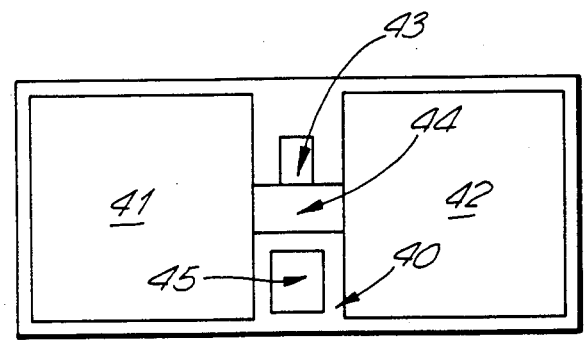
Figure 15:
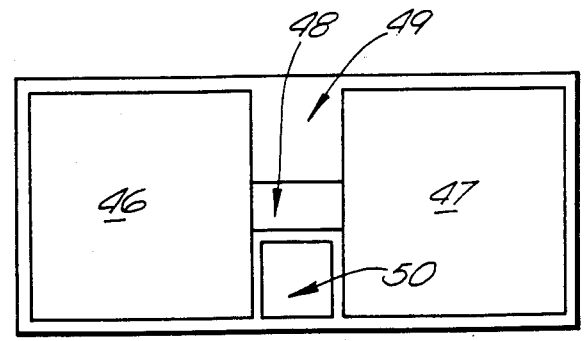

Whilst in the embodiment described above the aerials serving to produce the two aerial beams are arranged vertically above one another, FIGS. 14 and 15 show a variant with aerials arranged horizontally adjacent to each other.

The transmitter is shown in FIG. 14 and contains a base plate 40 on which the other parts of the transmitter are arranged. The oscillator 43, the splitter 44 and the exciter 45, as in the embodiment described above, are arranged between the aerials 41 and 42 which in this case are arranged horizontally adjacent to each other. The aerials are constructed as planar aerials. The aerial 41 produces the lower aerial beam, the beam axis of which has an inclination of 0°. The aerial 42 produces the upwardly directed aerial beam which does not essentially touch the ground.

The receiver shown in FIG. 15 has two planar aerials 46, 47 (similar to those in the transmitter) and also a receiving module 48 and a receiver circuit 50. The said components are provided on a metal base plate 49. The aerial 46 produces the lower aerial beam, the maximum sensitivity of which lies at an angle 0 (relative to the horizontal), whilst the aerial 47 produces the upwardly directed aerial beam which undergoes practically no ground reflection.

The functioning of this embodiment corresponds to that of the variant with aerials arranged vertically above one another. Here too the output signals of the two receiving aerials are added vectorially and rectified in the receiving module. If either the lower or the upper aerial beam is broken this produces an alarm signal.

Figure 16:
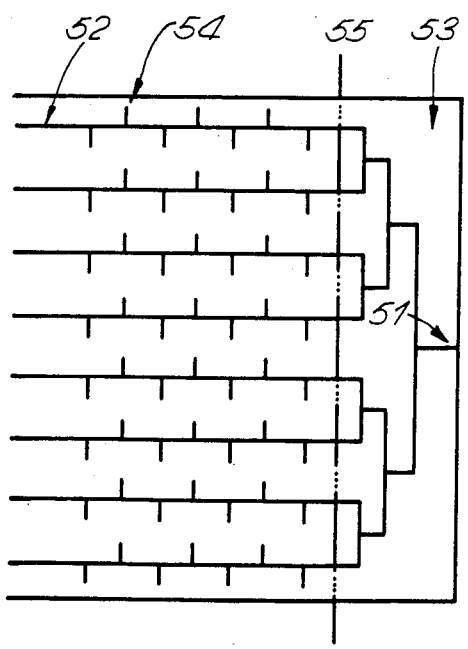

The construction of the aerials in this embodiment is somewhat different from the preceding construction. FIG. 16 shows the arrangement of the aerial producing the lower aerial beam. The signal coming from the output 51 of the splitter is divided between eight transmission lines 52. A plurality of dipoles 54 with half wave length are excited by the microwave passing along the transmission lines 52. The arrangement is such that at any point in time the phase and magnitude of the signal on the transmission lines 52 at points which correspond to each other (for instance along the line 55) is equal. Here $\alpha$ is greater than $\theta/2$. The dipoles 54 are arranged so that the combined radiation forms an aerial beam axis of which forms an angle 0 relative to the horizontal and which is polarised principally in a vertical plane. The aerial arrangement is located on a substrate 53 made from insulating material as in the embodiment described above.

Figure 17:
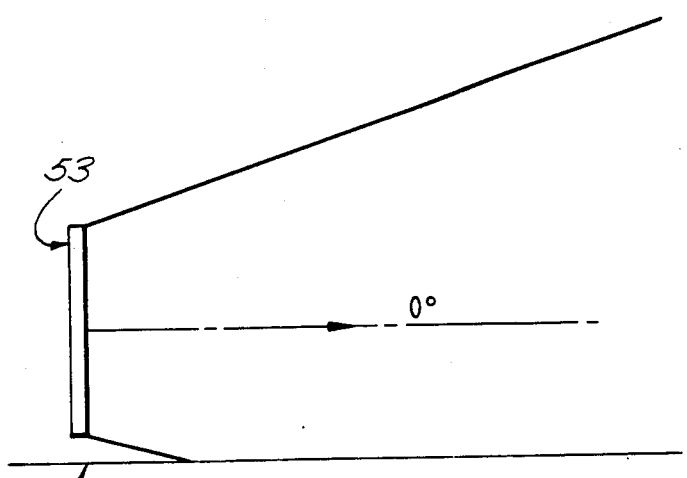

The beam characteristic is shown in FIG. 17. The aerial 53 is arranged near the ground 56. The beam axis has an angle of elevation of 0°. The construction and functioning of the aerial belonging to the lower aerial beam on the receiving side are essentially the same.

Figure 18:
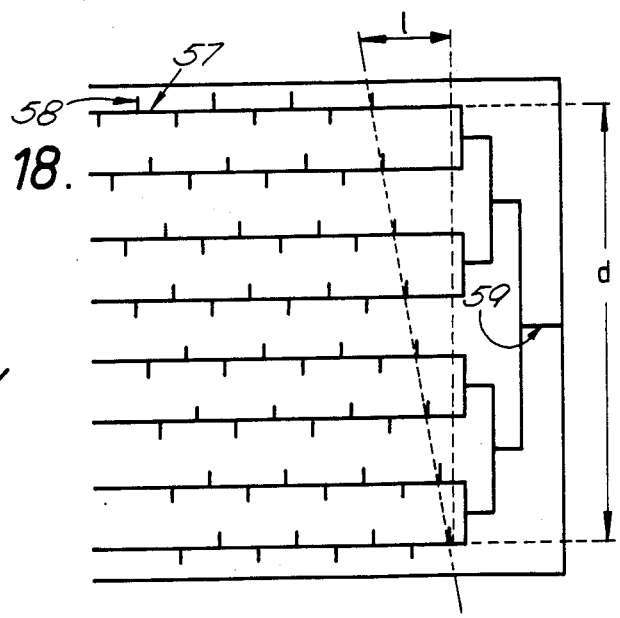
Figure 19:
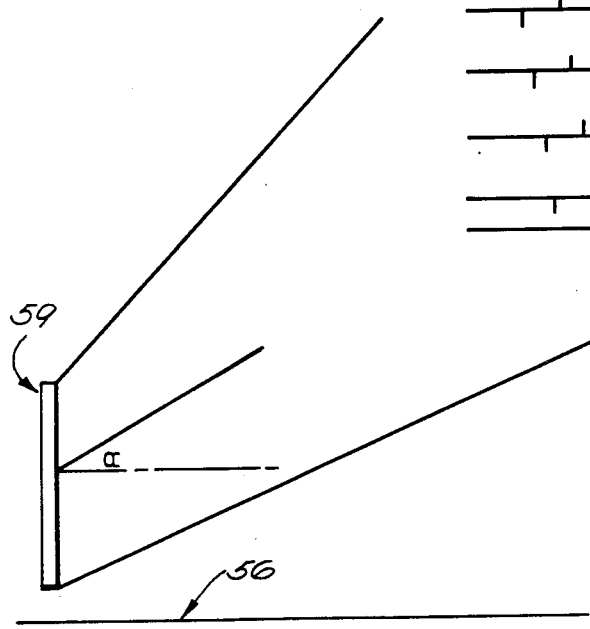

FIG. 18 shows the construction of the aerial for the upper aerial beam. It corresponds essentially to the aerial shown in FIG. 16 for the lower aerial beam, but the transmission lines 57 are arranged so that a differing phase is produced for the dipoles 58 connected to the individual transmission lines 57. The phase for the dipoles of each transmission lines is selected by selecting the length of path between the input 59 and the first dipole of the relevant transmission line 57.

The angle of inclination $\alpha$ of the beam axis (i.e. the direction of maximum beam strength) can then be determined by the formula:

$$\alpha = \sin^{-1}(l\sqrt{\epsilon_r}/d)$$

in which 1 and d are the dimensions to be found in FIG. 18 and $\epsilon_r$ is the effective relative dielectric constant of the substrate.

In the horizontal plane the aerials 41, 42, 46 and 47 have a maximum which lies in a direction running at right angles to the plane of the base plate 49, This is achieved by selecting the distance of the individual dipoles 58 on the same transmission line 57 exactly in phase. For this purpose the distance d is determined as follows:

$$d = \lambda/\sqrt{\epsilon_r}$$

in which
 $\lambda$ = wavelength
 $\epsilon_r$ = effective relative dielectric constant of the substrate.

Figure 20:
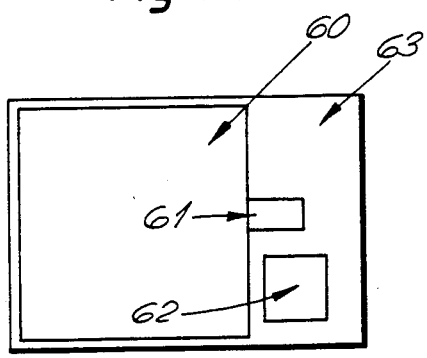
FIGS. 7, 8, 14, 15, 20, and 21 show the transmitter and receiver units.
Figure 21:
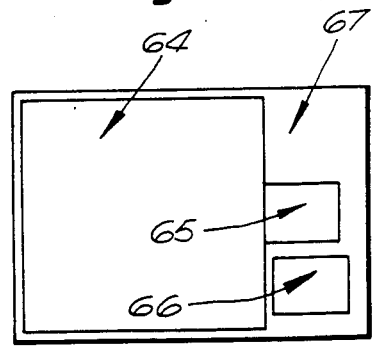
Figure 4:
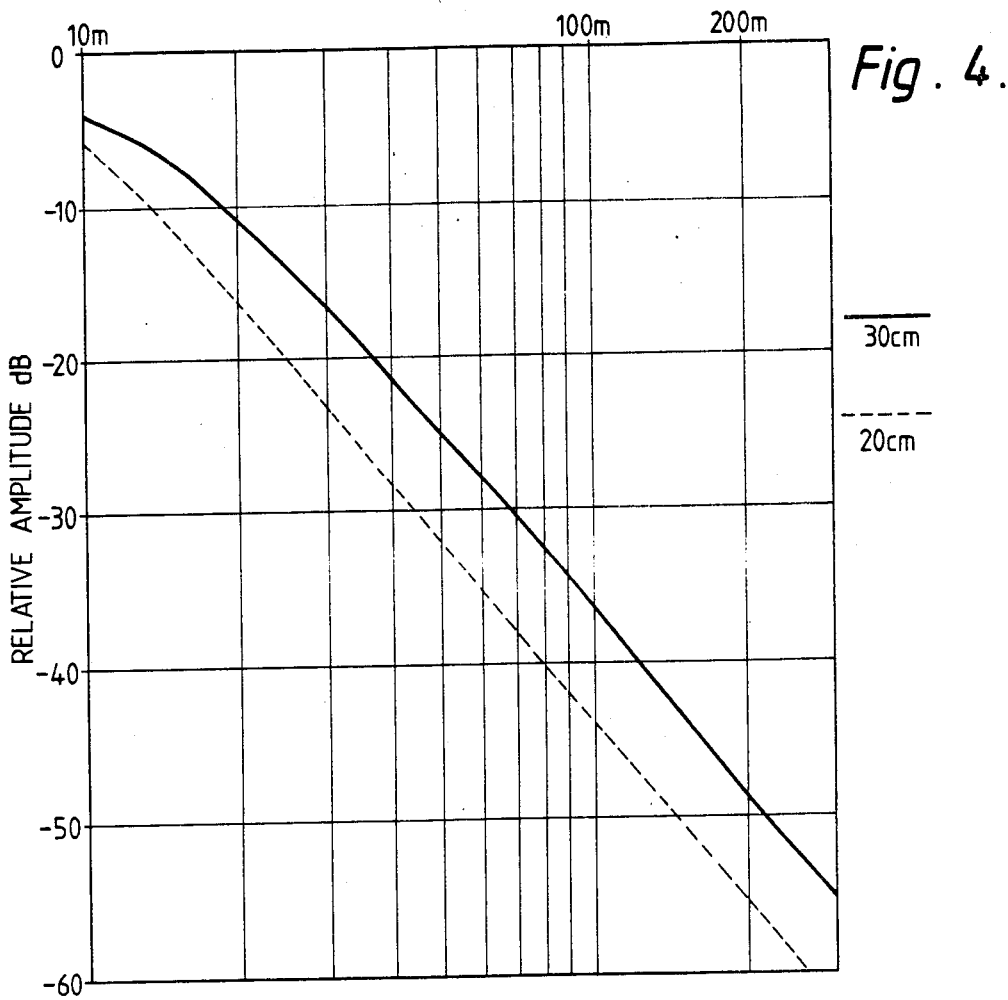

A further embodiment of the invention in which the aerials for producing (or for receiving) the upper and lower aerial beam are formed by one single combined aerial is shown in FIGS. 20 and 21.

The transmitter shown in FIG. 20 contains a planar aerial 60 which produces two separate aerial beams. It is excited by an oscillator 61 which is supplied by an exciter 62. The whole arrangement is located on a conductive base plate 63.

In a corresponding manner the receiver shown in FIG. 21 contains a planar aerial 64 which is constructed identically to the aerial 60. The output signal from the aerial is supplied to a microwave receiving module 65 and demodulated there. The amplification and further processing of the resulting low-frequency signal takes place in a printed receiver circuit 66 which thus supplies an alarm signal when an attempt is made by an intruder.

Figure 22:
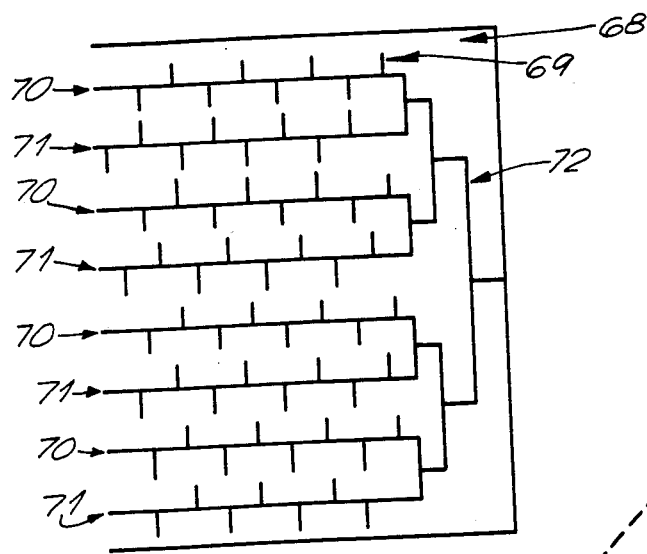

The construction of the two aerials 60 and 64 is shown in FIG. 22. The aerial is located on a substrate 68 made from insulating material on which a pattern of conductive strips has been produced using etching techniques. Eight strip-shaped aerial elements 70, 71 excite a plurality of dipoles 69 in such a way that the desired beam characteristics are achieved.

The aerial elements 70 are dimensioned so that the combined radiation of the proportions of the radiation from the dipoles of these aerial elements forms an aerial beam the maximum of which lies at right angles to the plane of the substrate 68.

On the other hand, the aerial elements 71 are dimensioned so that the radiation produced by their dipoles forms an aerial beam which is propagated upwards so that the greater part of this aerial beam does not touch the ground.

A divider circuit 72 divides the incoming signal in the transmitter into eight equal parts which excite the aerial elements 70 and 71. In the receiver 72 corresponds to a combination circuit which forms the vector sum of the signals which are supplied by the aerial elements 70, 71. Thus the circuit 72 adds up the signals of the two aerial beams in the receiver.

Figure 23:
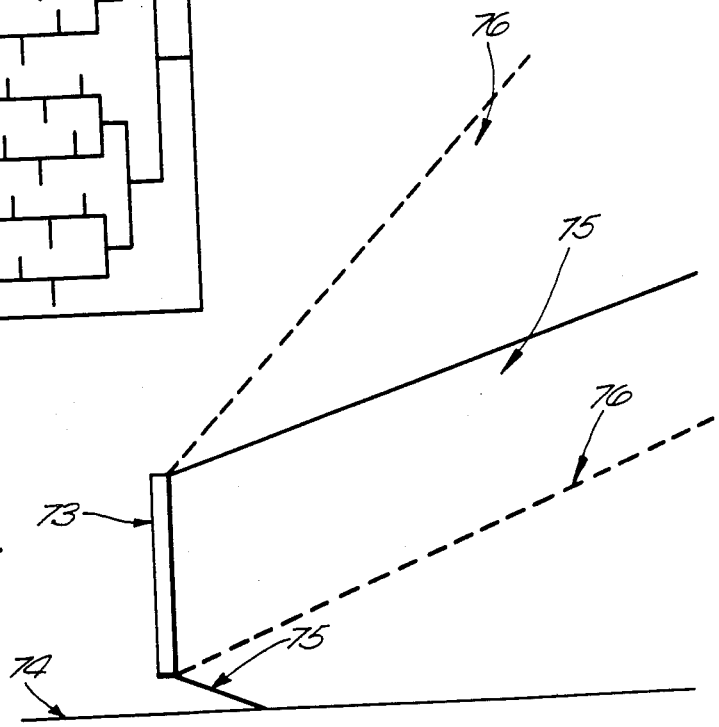

FIG. 23 shows the resulting aerial characteristic. The aerial arrangement 73 is arranged near the ground 74. The lower aerial beam 75 is propagated at an angle of elevation 0 (i.e. beam axis parallel to the ground); as a result any movement by an intruder near the ground will lead to an alteration in the received signal of this lower aerial beam.

The upper aerial beam 76 is propagated at an angle of elevation which is greater than half the beam width. As a result this upper aerial beam does not touch the ground. Since it does not undergo any significant ground reflection this results in an even, continuous dependence of the received signal strength upon the distance.

Figure 24A:
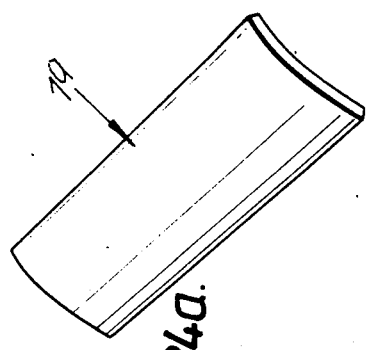
Figure 24:
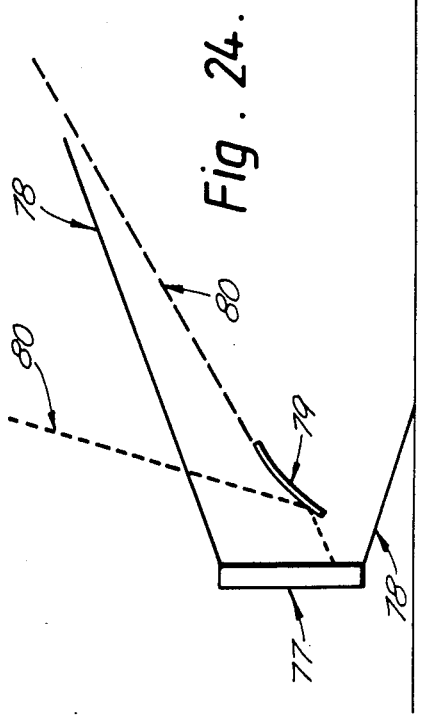

FIGS. 24, 24a show a further embodiment of the invention in which a passive reflector is used in order to deflect a part of the lower aerial beam upwards and in this way to produce the upper aerial beam.

The transmitter and the receiver each contain a microwave aerial 77 which can be constructed as a planar aerial, a parabolic aerial or in any other way and produces an aerial beam 78 which is propagated in a direction towards the receiving aerial. A passive reflector 79 made from metal material is arranged partially in the path of the beam and reflects a part of the aerial beam upwards so that an upwardly directed aerial beam 80 is produced. If an intruder passes either the lower aerial beam 78 or the upper aerial beam 80 then the alteration in the received signal which this produces triggers an alarm.

Figure 25:
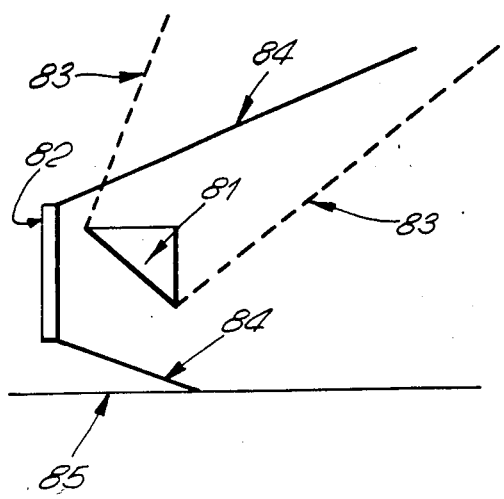
Figure 26:
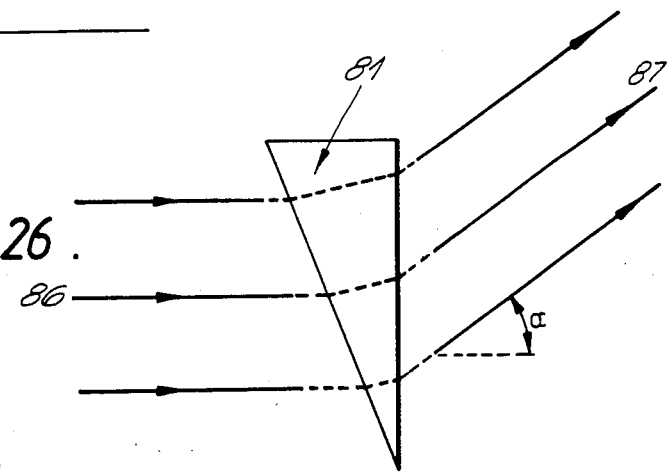

FIGS. 25 and 26 show as a further variant the arrangement of a microwave prism in the path of the beam. The prism 81 is made from dielectric insulating material. Its dimensions are selected so that when the microwave beam is broken the direction of propagation is deflected upwards in the prism. As shown in FIG. 25, the prism 81 is arranged in front of a transmitting aerial 82 the beam axis of which points in the direction of the corresponding aerial in the receiver. The radiation falling on the prism 81 is reflected upwards and forms the upper aerial beam 83 which does not touch the ground, whilst the lower aerial beam 84 strikes the ground 85 in the manner described.

FIG. 26 clarifies the functioning of the prism 81. The radiation 86 coming from the transmitting aerial is deflected upwards by the prism 81 by an angle of refraction $\alpha$ and forms the upper aerial beam 87.

A further possibility for producing one or more upper aerial beams lies in the use of a Fresnel lens in the lower aerial beam.

A Fresnel lens contains a plurality of stages in a dielectric insulating medium. An incoming microwave passes through this Fresnel lens and is radiated with a number of different angles which are determined by the interference pattern between the waves passing through the slot parts and the unslotted main regions.

Figure 27:
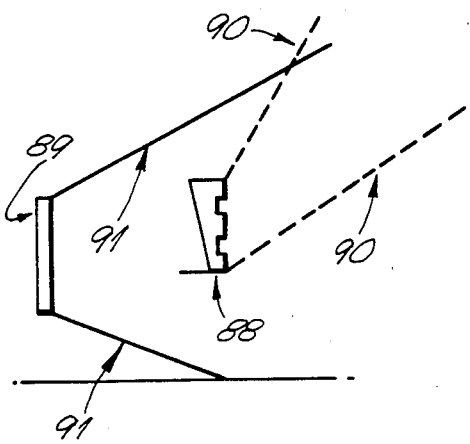

As FIG. 27 shows, the Fresnel lens 88 is arranged in the main beam 91 of the transmitting aerial 89. The lens 88 produces a plurality of upwardly directed aerial beams 90 which form the additional zone of protection at height of the microwave barrier according to the invention.

Figure 28:
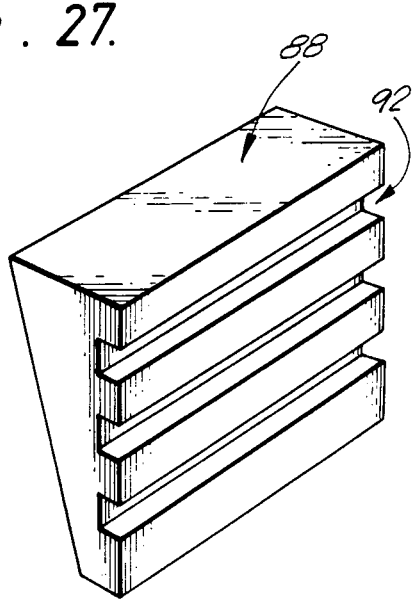

The Fresnel lens 88 is shown in detail in FIG. 28. It contains a block of dielectric insulating material which has a plurality of slots 92. The depth of the slots 91, the relative dielectric constant of the dielectric material and the spacing of the slots determine the angle of propagation of the radiation leaving it for a predetermined frequency. The lens 88 is of wedge-shaped construction so that the incoming radiation is initially refracted upwards before it passes through the slots 92. This ensures that the aerial beams radiated by the Fresnel lens are principally propagated upwards at an angle.

Figure 29:
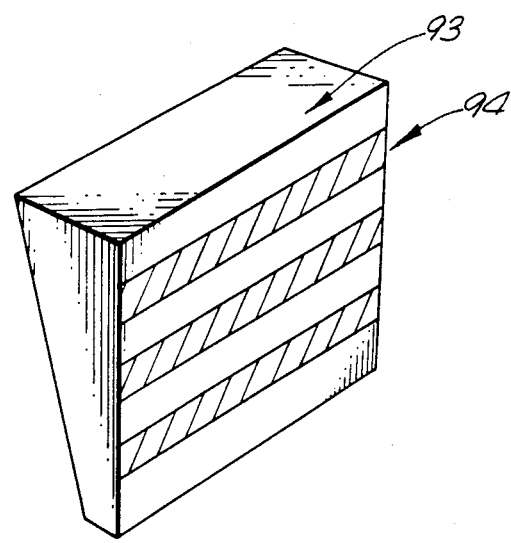
FIGS. 26–29 show antenna reflector and prism structure.

Finally, FIG. 29 shows an embodiment in which a diffraction screen is used in order to produce a plurality of aerial beams radiated at different angles from one single incoming aerial beam. The principle corresponds essentially to that of the Fresnel lens described above. The diffraction screen is arranged in front of the aerials which transmit or receive the lower aerial beam. The incoming radiation is divided into a plurality of aerial beams which are principally propagated upwards at an angle and in this way ensure the improved protection at height.

The diffraction screen shown in FIG. 29 contains a block 93 of dielectric insulating material on which a plurality of metallised strips 94 are provided. The position and width of these strips determine the directions of the outgoing aerial beams. The diffraction screen is produced in wedge form so that the incoming radiation is initially refracted upwards before scattering occurs on the metal strips 94.

I claim:

1. Microwave barrier containing a microwave transmitter with an associated transmitting aerial arrangement and a microwave receiver with an associated receiving aerial arrangement in which the transmitter and receiver are arranged at opposite ends of a section to be monitored and the receiver contains a circuit which responds to alterations in the received signal caused by an intruder, characterized in that at least a first and a second aerial for forming first and second aerial beams are provided, of which the first aerial beam forms a protection zone extending down to the ground whilst the second aerial beam is inclined upwards relative to the horizontal by an angle which is greater than the half-power width of this beam.

2. The invention of claim 1 wherein the first transmitting aerial providing said first aerial beam is displaced from the ground by a distance that prevents obliteration of said first aerial beam at said receiver.

3. Microwave barrier as claimed in claim 2, characterised in that the two aerials are offset relative to one another in the vertical direction.

4. Microwave barrier as claimed in claim 3, characterized in that the first aerial has a vertical radiating aperture equal to or less than about 32.5 cm and is mounted with a height equal to or less than about 40 cm above ground; and in that the angle of inclination $\alpha$ of the lower beam axis is about 0° relative to the horizontal.

5. Microwave barrier as claimed in claim 2, characterized in that the second aerial has a vertical radiating aperture equal to or less than about 34.5 cm and is mounted equal to or greater than about 1 m above the ground; and in that the angle of inclination $\alpha$ of the upper beam axis is greater than half the beam width relative to the horizontal.

6. Microwave barrier as claimed in claim 2, characterised in that the two aerials are offset relative to one another in the horizontal direction.

7. Microwave barrier as claimed in claim 2, characterised in that the two aerials are connected via a splitter to the same microwave oscillator.

8. Microwave barrier as claimed in claim 1, characterised in that for the production of the two aerial beams one single aerial and an arrangement for dividing the aerial beam are provided.

9. Microwave barrier as claimed in claim 8, characterised in that the arrangement for dividing the aerial beam is formed by a reflector.

10. Microwave barrier as claimed in claim 8, characterised in that the arrangement for dividing the aerial beam is formed by a prism.

11. Microwave barrier as claimed in claim 8, characterised in that the arrangement for dividing the aerial beam is formed by a Fresnel lens.

12. Microwave barrier as claimed in claim 8, characterised in that the arrangement for dividing the aerial beam is formed by a diffraction screen.

13. Microwave barrier as claimed in claim 1, characterised in that one single combined aerial is provided for the production of the two aerial beams.

14. Microwave barrier as claimed in claim 1, characterised by a circuit for the vectorial addition of the signals derived from the two aerial beams.

15. Microwave barrier as claimed in claim 1, characterised in that the circuit provided on the receiving side responds to alterations in the signals produced by the two aerial beams caused by an intruder.

* * * * *